(12) United States Patent
Williams

(10) Patent No.: US 9,128,882 B2
(45) Date of Patent: Sep. 8, 2015

(54) MOBILE CLIENT DEVICE DRIVEN DATA BACKUP

(75) Inventor: David L. Williams, Belmont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 11/835,628

(22) Filed: Aug. 8, 2007

(65) Prior Publication Data
US 2009/0041230 A1    Feb. 12, 2009

(51) Int. Cl.
*G06F 17/30* (2006.01)
*G06F 11/14* (2006.01)
*H04W 8/22* (2009.01)

(52) U.S. Cl.
CPC ........ *G06F 11/1448* (2013.01); *G06F 11/1464* (2013.01); *G06F 11/1469* (2013.01); *H04W 8/22* (2013.01)

(58) Field of Classification Search
CPC ... G06F 11/1464; G06F 21/305; G06F 21/31; G06F 2221/2103; G06F 2221/2107; G06F 11/006; G06F 11/1453; G06F 11/1458; G06F 21/10; G06F 21/6245; G06F 2221/0782; G06F 2221/2129; G06F 17/30082; G06F 21/60; G06F 21/604; G06F 11/1448; G06F 11/1469; G06F 17/30557; G06F 17/30581; H04W 8/22

See application file for complete search history.

(56) References Cited

U.S. PATENT DOCUMENTS

| | | | |
|---|---|---|---|
| 6,865,655 B1 * | 3/2005 | Andersen | 711/162 |
| 6,985,719 B2 * | 1/2006 | Leppinen et al. | 455/412.1 |
| 7,890,746 B2 * | 2/2011 | Desai et al. | 713/150 |
| 2002/0156921 A1 * | 10/2002 | Dutta et al. | 709/246 |
| 2003/0134625 A1 * | 7/2003 | Choi | 455/418 |
| 2005/0137983 A1 * | 6/2005 | Bells | 705/51 |
| 2006/0230081 A1 * | 10/2006 | Craswell et al. | 707/204 |
| 2007/0021112 A1 * | 1/2007 | Byrne et al. | 455/419 |
| 2007/0165844 A1 * | 7/2007 | Little | 380/30 |

* cited by examiner

*Primary Examiner* — Dinku Gebresenbet
(74) *Attorney, Agent, or Firm* — Mahamedi Paradice LLP

(57) ABSTRACT

Tasks associated with backing up the data of a mobile client device are performed predominantly by the mobile client device. A backup server functions as a server with limited functionality that merely stores backup data received from the mobile client device and retrieves the backup data under the request of the mobile client device. The mobile client device functions as a master device, and the backup server functions as a slave device. A backup program for performing tasks associated with the backup operation on the mobile client device may itself be stored as part of the backup data.

12 Claims, 4 Drawing Sheets

MOBILE CLIENT DEVICE DRIVEN DATA BACKUP

BACKGROUND

The present disclosure relates generally to backing up the data of mobile client device to a backup server, specifically to backing up the data of the mobile client device in a manner that requires performance of minimal tasks on the part of the backup server.

Data stored in a mobile client device is backed up in a backup device either to restore the mobile client device to an operational state after a disaster or to restore some files or data that were accidentally deleted or became corrupt. During a backup operation, the backup data of the mobile client device is sent to a backup device (e.g., a backup server) for its safe storage. The backup data can later be retrieved during a restore operation to restore the mobile client device to the previous state where the backup data was created or to replace the corrupted data or supplant the deleted data.

The backup operation is particularly important in the mobile client devices because mobile client devices are more vulnerable to loss of data compared to stationary client devices. For example, mobile client devices can experience depletion of power source which may wipe out the data stored in volatile memory of the mobile client device. Also, the mobile client device may be inadvertently mishandled or become lost, resulting in corruption or loss of the data stored in the mobile client device. If the data is lost or corrupted, the user needs to restore the backup data to the mobile client device in order to resume his use of the mobile client device from the state before the data corruption or loss. Alternatively, the data may be restored to a replacement mobile client device that replaces a previous mobile client device for reasons such as losing the previous mobile client device, damages to the previous mobile device, or an upgrade from the previous mobile client device.

The backup operation is generally performed by storing the backup data in a backup server physically separate from a client device. The backup data may then be retrieved from the backup server during the restore operation to restore the data of the client device. Conventionally, the backup server performs various tasks associated with backing up and restoring the data of the mobile client device including, among other tasks, identifying the data to be backed up, comparing the backup data received from the client device, encrypting the backup data, performing deduplication to remove any redundancy in the backup data, authenticating the client device, decrypting the backup data, and sending the backup data to the client device.

Requiring the backup server to perform various tasks associated with the backup and restore operation is disadvantageous for at least the following reasons. The backup server must be capable of storing and running backup programs related to the backup and restore operation. If various types of backup servers are used, the backup program must be deployed on each backup server. This may result in waste of the backup server resource, especially if the backup server interacts with multiple types of mobile client devices requiring different backup programs.

Further, the backup data stored in the backup server is vulnerable to unauthorized access by a third party because the backup program for encrypting or decrypting the backup data is running on the backup server. The third party making unauthorized access to the backup data may take advantage of the backup program stored in the backup server to decrypt the backup data. Therefore, storing the backup program and the backup data on the same backup server is vulnerable to unauthorized access.

Another type of backup devices often used is flash memory cards such as Secure Digital (SD) card or memory stick. These flash memory cards are generally inserted into the slots integrated with the mobile client device and stores various data, including the backup data. The disadvantage of using the flash memory cards is that the mobile client device must dedicate already scarce real estate of the mobile client device to the slots. Also, the types of flash memory cards that can be used are limited to the type of card slots implemented on the mobile client device. Another disadvantage of using the flash memory cards is that their cost per unit memory size is much expensive than the backup servers. Moreover, the flash memory cards must be manually inserted into the mobile client device before performing the backup operation, which is inconvenient to the user. The reliability of using the flash memory cards is also questionable because the flash memory cards can be easily lost, stolen, or damaged after being removed from the mobile client device.

Therefore, among other deficiencies, the present art lacks backup architecture and methods that allow more generic network storage devices to be used as backup server. The present art also lacks backup architecture and methods that enhance the security of the backup data stored in the backup server.

SUMMARY

Embodiments disclosed employ a master-slave model to shift most of the tasks associated with backup operation from a backup server to a mobile client device. Tasks for backing up the data stored in the mobile client device are performed predominantly by the mobile client device. The backup server is relegated to performing minimal tasks associated with transporting and storing the data of the mobile client device. Because most of the tasks associated with the backup and restore operations are performed by the mobile client device, less restrictions or requirements are imposed on the backup server.

In one embodiment, the backup server does not perform tasks associated with data backup and data restore other than storing the backup data during a backup operation, and retrieving and sending the backup data to the mobile client device during a restore operation. All of the other tasks associated with the data backup and data restore are performed by the mobile client device.

In one embodiment, the backup operation is performed by a backup program running on the mobile client device. The mobile client device runs the backup program to perform the backup operation and the restore operation of the data in the mobile client device. The backup program may be stored in the backup server as part of the backup data. When initializing the mobile client device, the mobile client device may retrieve the backup program from the backup server, and deploy the backup program on the mobile client device. Then, the backup program retrieves the backup data stored in the backup server and performs the restore operation.

Performing tasks associated with the data backup predominantly by the mobile client device allows simpler types of backup servers to be used for backing up the data of the mobile client device. Simpler backup servers may more easily support a broader range of mobile devices without updates to a backup server program and can support extension of the backup data set to include more data types and different data structures with no changes or minimal changes to backup server operation. In one embodiment, the backup servers are commodity storage devices that reduce the cost of backup or restore operations. Also, the backup data stored in the backup server is more secure because the backup server does not need to store any keys or programs to decrypt the backup data.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

Embodiments disclosed can be readily understood by considering the following detailed description in conjunction with the accompanying drawings.

DETAILED DESCRIPTION OF EMBODIMENTS

Tasks associated with the backup operation are performed predominantly by the mobile client device in the following embodiments. The backup server has specialized or limited functions (e.g., an appliance or simple storage server), and merely performs the tasks of storing backup data received from the mobile client device during the backup operation, and retrieving the backup data under the request of the mobile client device during a restore operation. In other words, the mobile client device functions as a master device, and the backup server functions as a slave device. The backup server (slave device) device performs tasks associated with the backup operation in accordance with instructions from the mobile client device (master device).

The backup server refers to a computing device that is located remotely from the mobile computing device, and has processing capacity and storage space to store the backup data. The backup server may be a computing device dedicated to backing up the data of the mobile client server. Alternatively, the backup server may be a general purpose computing device that stores the backup data in addition to performing other tasks unrelated to the data backup.

The mobile client device refers to any portable computing device having the data for backup. The mobile client device can be computing devices including, among others devices, a smartphone, a personal digital assistant (PDA), a game console, an MP3 player, and a mobile phone. The mobile client device may also be referenced as a mobile computing device or handheld computing device. The mobile client device includes at least a component for communicating with the backup server, and a component for performing the backup operation.

The tasks associated with the data backup include tasks associated with restoring the backup data to the mobile client device. The tasks associated with the data backup include, among other tasks, identifying the data of the mobile client device to be backed up, deduplicating the data to be backup up, time stamping the data to be backed up, compressing the data identified for backup, encrypting the compressed data, establishing connection between the mobile client device and the backup server, sending the backup data to the backup server, storing the backup data in the backup server, retrieving the backup data from the backup server, tracking changes in the data for backup to perform incremental data backup, and restoring the backup data onto the mobile client device.

Example Backup Architecture

Figure 1:
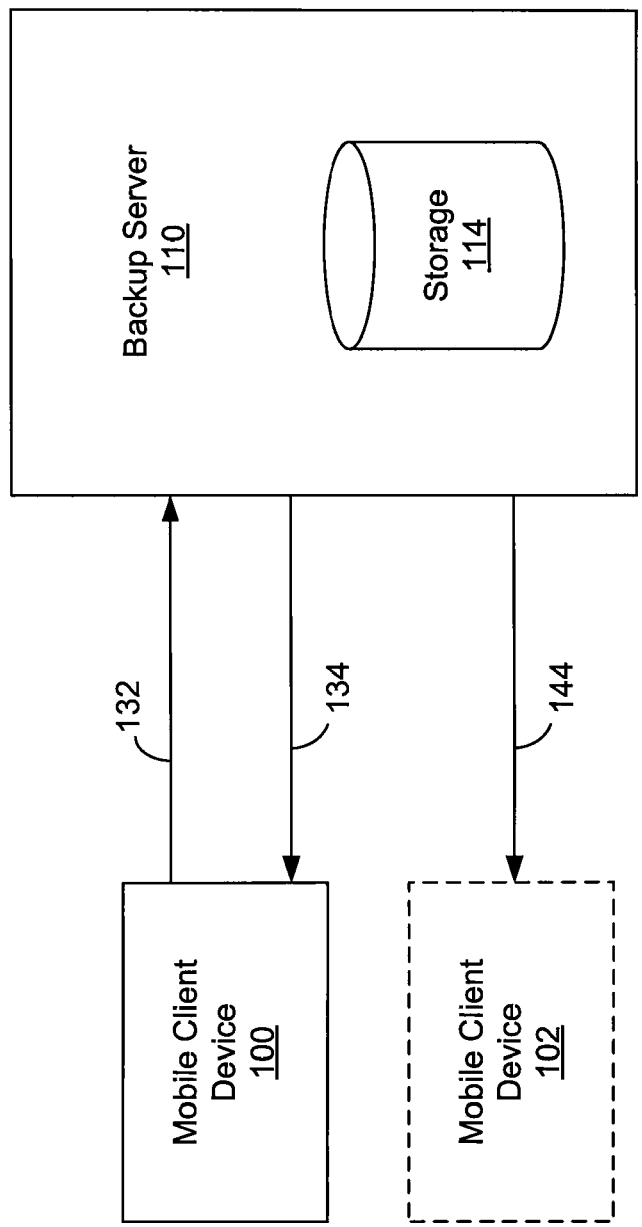
FIG. 1 is a schematic diagram illustrating backup architecture according to one embodiment.

FIG. 1 is a schematic diagram illustrating backup architecture, according to one embodiment. A mobile client device 100 initiates a backup operation with a backup server 110. During the backup operation, the mobile client device 100 sends its backup data 132 to the backup server 110. During a restore operation (subsequent to the backup operation), the mobile client device 100 receives the backup data 134 from the backup server 110 and restores the backup data 134 on the mobile client device 100.

In one embodiment, the backup data 132 backed up by the mobile client device 100 is restored onto the other (e.g., alternate or second) mobile client device 102. The mobile client device 102 receives backup data 144 from the backup server 110. By receiving and restoring the backup data of the mobile client device 100, the user may continue the use the data of the mobile client device 100 on the mobile client device 102. The backup data 144 may be the same as the backup data 132 from the mobile client device 100 or it may a portion of the backup data 132 that is compatible with the mobile client device 102.

The mobile client device 102 (e.g., the second or alternate mobile client device) may be a device of the same type as the mobile client device 100. Alternatively, the mobile client device 102 may be a device that is of a type different from the mobile client device 102. For example, if the mobile client device 100 is a smartphone operating on Palm Inc.'s Palm Operating System, the mobile client device 102 may be the same or different type of smartphone operating on Microsoft's Windows Mobile Operating System.

In one embodiment, the mobile client device 100 may communicate with the backup server via a wire, a short range radio protocol or a long range radio protocol, as explained below in detail with reference to FIG. 2.

In one embodiment, the backup server 110 includes a storage module 114 for storing the backup data received from the mobile client device 100. The backup server 110 may include, among other devices, a desktop computer, a laptop computer, and a database server. In one embodiment, the backup server 110 may be a device paired with the mobile client device 100 that extends the capabilities of the mobile client device 100. The paired device may be operable only in conjunction with the mobile client device 100.

In one embodiment, the task performed by the backup server 110 in connection with the data backup is limited to storing of the backup data. All of the other tasks associated with the data backup are performed by the mobile client device 100. For example, identifying data to be backed up, time stamping the data to be backed up, compressing of the data, deduplicating of the data to be backed up, encrypting the compressed data, decrypting the backup data, resolving any conflicts with the backup data, retrieving of the backup data, decrypting of the backup data, decompressing of the backup data, tracking changes in the data for backup to perform incremental data backup, and restoring of the backup data in the mobile client device 100 are all performed by the mobile client device 100.

Performing tasks associated with the data backup predominantly by the mobile client device 100 is advantageous because more types of backup servers 110 can be used for backing up the data of the mobile client device 100. For example, a limited function server (e.g., a simple storage server) or a server having specialized processing capacity may be used as the backup server 110 because only minimal tasks or processes (storing and retrieving the backup data) are performed during the backup operation and the restore operation. Such server may be configured as a specialized appliance configured for this backup, storage, and restoration configurations.

Another advantage of having the backup server 110 to perform most of the tasks associated with the data backup is that, because the encryption and decryption are performed by the mobile client device 100, the backup server 110 does not need to store any keys or programs to encrypt or decrypt the backup data. Even if an unauthorized access to the backup data in the backup server 110 is made, there is no key or information available from the backup server 110 that would allow decryption of the backup data. Therefore, encrypting and decrypting the backup data by the mobile client server 100 is more secure than encrypting and decrypting the backup data by the backup server 110. The backup server may also have a simple architecture, reducing the cost of the backup server needed to perform the backup operation.

Example Mobile Client Device

Figure 2:
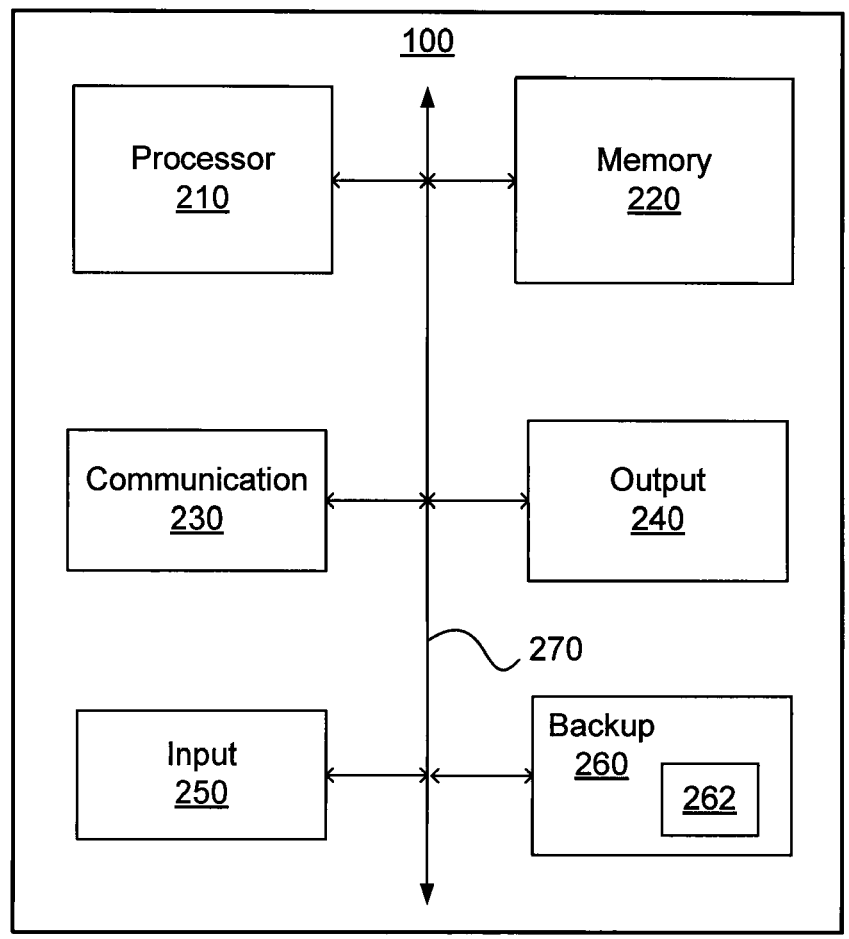
FIG. 2 is a block diagram illustrating a mobile client device, according to one embodiment.

FIG. 2 is a block diagram illustrating a mobile client device 100, according to one embodiment. The mobile client device 100 includes, among other components, a processor 210, a memory module 220, a communication module 230, an output module 240, an input module 250, a backup module 260, and a bus 270. These components are briefly explained herein to the extent they are directly related to the invention. Each component of the mobile client device 100, whether alone or in combination with other components, may be implemented for example, in software, hardware, firmware or any other combination thereof.

The software or firmware may be embodied as instructions for the processors 210. The processor 210 executes instructions associated with the operation of the mobile client device 100. The memory module 220 (or other tangible computer readable medium) stores program codes (e.g., instructions) to be executed by the processor including, but not limited to, data items associated with application programs operable on the mobile client device 100. The memory module 220 may be a non-volatile type persistent memory such as a hard disk, a compact flash, or an EEPROM. The memory module 220 may also be a volatile type such as a random access memory, a buffer, a cache, a register, a combination of non-volatile and volatile memory, or other device capable of storing instructions and data.

The communication module 230 performs peer-to-peer communication or network-based communication with the backup server 110. In one embodiment, the communication module 230 communicates with the backup server 110 via a wire (using, for example, Universal Serial Bus (USB) or RS232C) or a short range radio protocols (using, for example, Bluetooth or Wireless Fidelity (WiFi) protocol). In another embodiment, the communication module 230 communicates with the backup server 110 via a long range radio protocol such as Global System of Mobile (GSM) communication, a Code Division Multiple Access (CDMA) communication, a Universal Mobile Telecommunications System (UMTS) communication, General Packet Radio Service (GPRS), third-generation (3G) mobile communication, High Speed Download Packet Access (HSDPA), and Worldwide Interoperability for Microwave Access (WiMAX).

The output module 240 includes an output controller (not shown) that is coupled to output devices such as a display device or a speaker. The input 250 includes an input controller (not shown) that is coupled to an input device such as a keypad or a touch screen to receive inputs from a user. The input module 240 and the output module 250 may be implemented as hardware, software, or a combination thereof. The input module 240 and the output module 250 may also be capable of servicing other input/output modules or peripheral devices associated with the mobile client device 100.

The backup module 260 performs tasks associated with the backup of the data in the mobile client device 100. During the backup operation, the backup module 260 identifies the data to be backed up from the memory 220, attaches time stamps to the data to be backed up, deduplicates the data to be backed up, compresses the data to be backed up into one or more files, and encrypts the data using encryption algorithms. Then the backup module 260 sends the backup data to the backup server 110 via the communication module 230. During the restore operation, the backup module 260 retrieves the backup data from the backup server 110, decrypts the backup data, decompresses the backup data, and then restores decompressed data to the memory 220.

In one embodiment, the backup module 260 is implemented as a combination of hardware component and software component. The software component of the backup module 260 is hereinafter referred to as a backup program 262. The backup program includes instructions associated with the backup and restore operation. The backup module 260, either alone or in conjunction with the processor 210, performs tasks as defined by the backup program 262.

In one embodiment, a copy of the backup program 262 itself may be backed up by the backup module 260. When the mobile client device 100 is initialized or the backup data is restored on a new mobile client device (referring to FIG. 1, for example, the mobile client device 102) the initialized mobile client device or the new mobile client device may retrieve the backup program 262 from the backup server 110, and deploy the backup program 262 on the mobile computing device 100. The deployed backup program 262 then performs the restore operation, as explained below in detail with reference to FIG. 4.

In one embodiment, the backup server 110 stores the backup program 262 for various types of devices. When initialized, the mobile client device 100 automatically retrieves a compatible backup program when connected to the backup server 110. The mobile client device 100 then deploys the backup program. After the backup program is deployed, the backup module 260 (now operational with the installed backup program 262) retrieves the backup data from the backup server 110 and restores the data in the mobile client device 100. In one embodiment, the backup program 262 only retrieves the backup data that is compatible with the mobile client device 100 on which the backup program is running. In another embodiment, the backup program 262 retrieves all of the backup data from the backup server 110, and then selectively restores the data that is compatible with the mobile client device 100. By automatically retrieving or restoring the compatible data, the user's intervention during the restore operation is minimized. It is noted that the processor 210, the memory module 220, the communication module 230, the output module 240, the input module 250, and the backup module 260 communicate with each other through a conventional bus 270. More than one component of the mobile client device 100 may be combined into a single unit. For example, the software component of the backup module 260 may be combined with the memory module 220 and the hardware component of the backup module 260 may be combined with the processor 210.

In one embodiment, the backup module 260 backs up selected data in the memory 220. Specifically, the backup module 260 generates the backup data for all or selected data of the following data: application programs that are preinstalled on the mobile client device 100, the configuration data for the operating system, the configuration data of application programs, background or color schemes for the screen of the mobile client device 100, and notification configurations (e.g., ringtones or vibration). The backup module 260 may also generate the backup data for different data during each backup session.

Example Method of Backing Up and Restoring Data of Mobile Client Device

Figure 3:
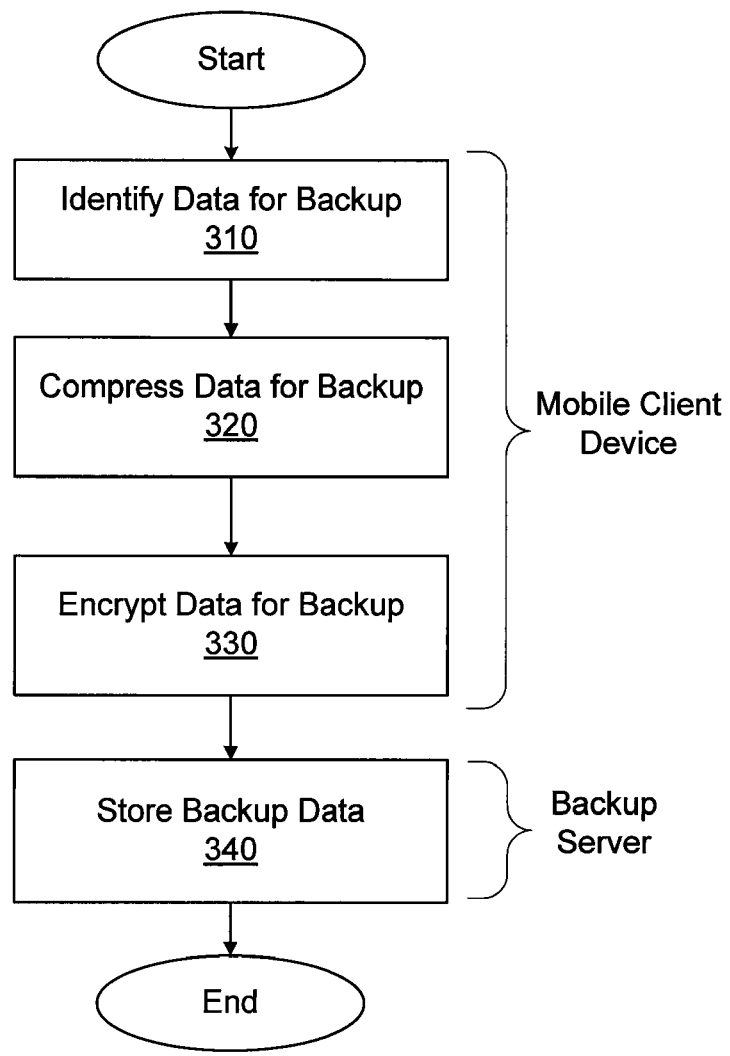
FIG. 3 is a flowchart illustrating a method of backing up the data of a mobile client device in a backup server, according to one embodiment.

FIG. 3 is a flowchart illustrating a method of backing up the data of the mobile client device 100 in the backup server 110, according to one embodiment. First, the mobile client device 100 identifies 310 data to be backed up in the backup server 110. In one embodiment, the backup module 260 searches for all the data in memory 220 marked for backup.

The data to be backed up is compressed 320 into one or more files. In one embodiment, a deduplication process may be performed before compressing of the files to remove any redundant data from the backup data. The compressed data is encrypted 330 using an encryption algorithm. The encrypted backup data is sent to the backup server 110 and is stored 340 in the storage 114 of the backup server 110.

Note that the tasks associated with the data backup of the mobile client device are performed predominantly by the mobile client device 100. The only task performed by the backup server 110 associated with the backup operation is the storing 340 of the backup data. Performing tasks associated with the data backup predominantly by the mobile client device 100 allows more types of backup servers 110 to be used for backing up the data of the mobile client device 110.

Figure 4:
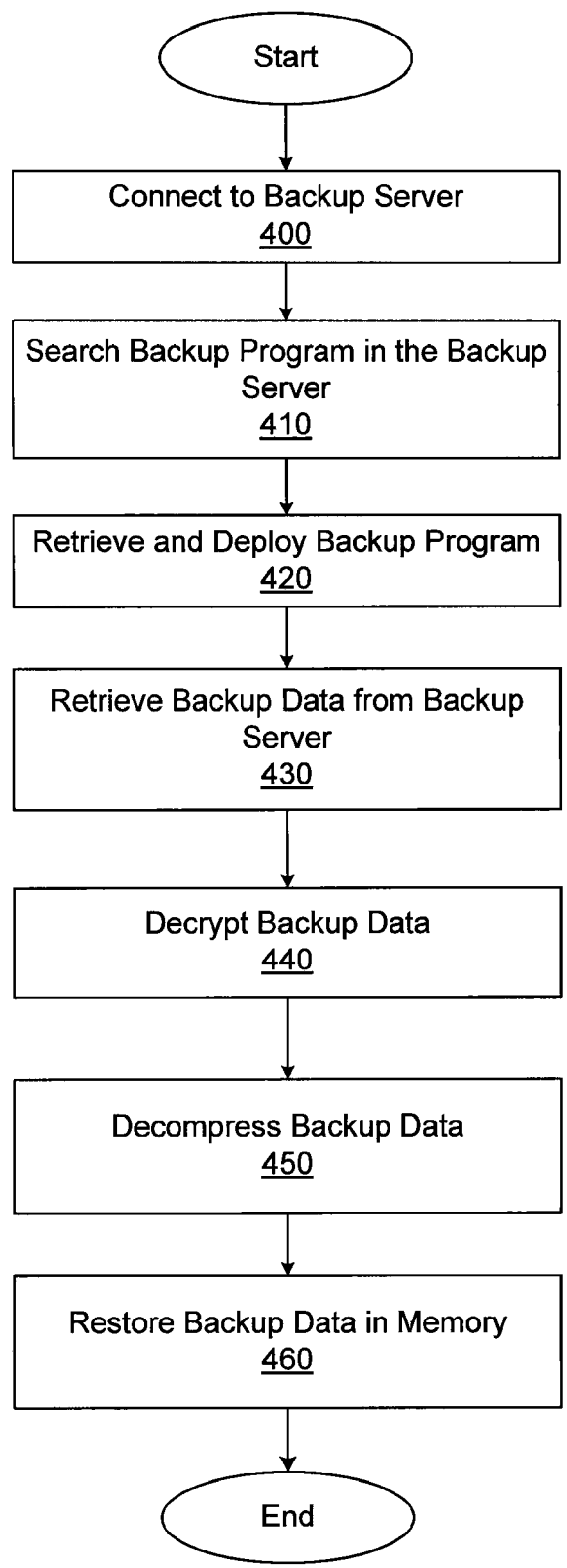
FIG. 4 is a flowchart illustrating a method of restoring backup data to a mobile client device, according to one embodiment.

FIG. 4 is a flowchart illustrating a method of restoring backup data from the backup server 110 to the mobile client device 100, according to one embodiment. In one embodiment, when the mobile client device 100 is initialized, the mobile client device 100 first connects 400 to the backup server 110, and searches 410 the backup server 110 for the backup program 262 that is compatible with the mobile client device 100. The backup program 262 is retrieved from the backup server 110 and deployed 420 in the backup module 260 of the mobile client device 100. The steps 410 and 420 may be obviated if the backup program is already installed and operational on the mobile client device 100.

The backup module 260 retrieves 430 the backup data from the backup device 110. The backup module 260 then decrypts 440 the backup data, and decompresses 450 the backup data. The backup module 260 restores 460 the decompressed data in the memory 240 of the mobile client device 100. In one embodiment, the backup module 260 selects and restores parts of the backup data that are compatible with the mobile client device 100.

Note that the tasks associated with the restoring of the data of the mobile client device are also performed predominantly by the mobile client device 100. The only operation performed by the backup server 110 associated with the restore operation is the retrieving and sending of the backup data to the mobile client device 100. As described above, performing tasks associated with the data backup predominantly by the mobile client device 100 is advantageous because this allows more types of backup servers 110 to be used for backing up the data of the mobile client device 110.

ALTERNATIVE EXAMPLES

As noted above, embodiments may be configured as software elements or modules.

The software may be written or coded using a programming language. Examples of programming languages may include C, C++, BASIC, Perl, Matlab, Pascal, Visual BASIC, JAVA, ActiveX, assembly language, machine code, and so forth. The instructions may include any suitable type of code, such as source code, object code, compiled code, interpreted code, executable code, static code, dynamic code, and the like. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application programming interfaces (API), instruction sets, computing code, computer code, code segments, computer code segments, words, values, symbols, or any combination thereof. The embodiments are not limited in this context.

Some embodiments may be implemented, for example, using any tangible computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

Also, use of the "a" or "an" are employed to describe elements and components of embodiments of the present invention. This was done merely for convenience and to give a general sense of the embodiments of the present invention. This description should be read to include one or at least one and the singular also includes the plural unless it is obvious that it is meant otherwise.

Performing tasks associated with the data backup predominantly by the mobile client device allows more types of backup servers to be used for backing up the data of the mobile client device. Another advantage of having the mobile client device to perform the data backup operations predominantly is that the backup data stored in the backup server is more secure because the backup server does not need to store any keys or programs to decrypt the backup data.

Upon reading this disclosure, those of skill in the art will appreciate still additional alternative structural and functional designs for a system and a process for a software configured multimedia control mechanism through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A mobile computing device, comprising:
    a non-transitory computer-readable storage medium to store data and a set of instructions corresponding to a backup program;
    a communication module to communicate with a backup storage device that is remote from the mobile computing device; and
    a processor, coupled to the communication module and the computer-readable storage medium, to execute the set of instructions corresponding to the backup program, wherein the set of instructions, when executed by the processor, causes the mobile computing device to run the backup program to perform operations comprising:
    identifying backup data stored in the computer-readable storage medium to be backed up to the backup storage device;
    performing a deduplication process of the backup data;
    compressing the backup data after performing the deduplication process for encryption;
    encrypting the backup data using a key that is stored in the mobile computing device but is not stored in the backup storage device; and
    transmitting the encrypted backup data and a copy of the set of instructions corresponding to the backup program to the backup storage device for storage via the communication module, the copy of the set of instructions corresponding to the backup program being stored on the backup storage device to initiate a restore operation to be performed by the mobile computing device, wherein the mobile computing device comprises a smartphone, a personal digital assistant (PDA), a media player, or a game console.

2. The mobile computing device of claim 1, wherein the backup storage device is paired with the mobile computing device.

3. The mobile computing device of claim 1, wherein execution of the set of instructions causes the mobile computing device to selectively identify the backup data by searching the computer-readable storage medium for data that is marked to be backed up.

4. The mobile computing device of claim 3, wherein the backup data includes at least one or more of (i) data corresponding to applications installed in the mobile computing device, (ii) configuration data for an operating system of the mobile computing device, or (iii) configuration data for notifications of the mobile computing device.

5. A method of backing up data on a mobile computing device, the method performed by a processor executing a backup program stored as a set of instructions in a memory of the mobile computing device, the method comprising:
    identifying backup data stored in the memory of the mobile computing device to be backed up to a backup storage device, the backup storage device being remote from the mobile computing device;
    performing a deduplication process of the backup data;
    compressing the backup data after performing the deduplication process for encryption;
    encrypting the backup data using a key that is stored in the mobile computing device but is not stored in the backup storage device; and
    transmitting the encrypted backup data and a copy of the set of instructions corresponding to the backup program from the mobile computing device to the backup storage device, the copy of the set of instructions corresponding to the backup program being stored on the backup storage device to initiate a restore operation to be performed by the mobile computing device, wherein the mobile computing device comprises a smartphone, a personal digital assistant (PDA), a media player, or a game console.

6. The method of claim 5, wherein identifying the backup data includes searching the memory of the mobile computing device for data that is marked to be backed up.

7. The method of claim 5, further comprising:
    adding a timestamp to the backup data.

8. The method of claim 5, wherein the backup data includes at least one or more of (i) data corresponding to applications installed in the mobile computing device, (ii) configuration data for an operating system of the mobile computing device, or (iii) configuration data for notifications of the mobile computing device.

9. A non-transitory computer-readable storage medium storing a set of instructions corresponding to a backup program that, when executed by a processor of a mobile computing device, causes the mobile computing device to run the backup program to perform operations comprising:
    identifying backup data stored in the non-transitory computer-readable medium to be backed up to a backup storage device that is remote from the mobile computing device;
    performing a deduplication process of the backup data;
    compressing the backup data after performing the deduplication process for encryption;
    encrypting the backup data using a key that is stored in the mobile computing device but is not stored in the backup storage device; and
    transmitting the encrypted data and a copy of the set of instructions corresponding to the backup program from the mobile computing device to the backup storage device for storage, the copy of the set of instructions corresponding to the backup program being stored on the backup storage device to initiate a restore operation to be performed by the mobile computing device, wherein the mobile computing device comprises a smartphone, a personal digital assistant (PDA), a media player, or a game console.

10. The non-transitory computer-readable storage medium of claim 9, wherein execution of the set of instructions causes the mobile computing device to selectively identify the backup data by searching the non-transitory computer-readable medium for data that is marked to be backed up.

11. The non-transitory computer-readable storage medium of claim 9, wherein the backup data includes at least one or more of (i) data corresponding to applications installed in the mobile computing device, (ii) configuration data for an operating system of the mobile computing device, or (iii) configuration data for notifications of the mobile computing device.

12. The non-transitory computer-readable storage medium of claim 9, wherein the execution of the set of instructions causes the mobile computing device to further perform operations comprising:

adding a timestamp to the backup data.

* * * * *